Figure 1:
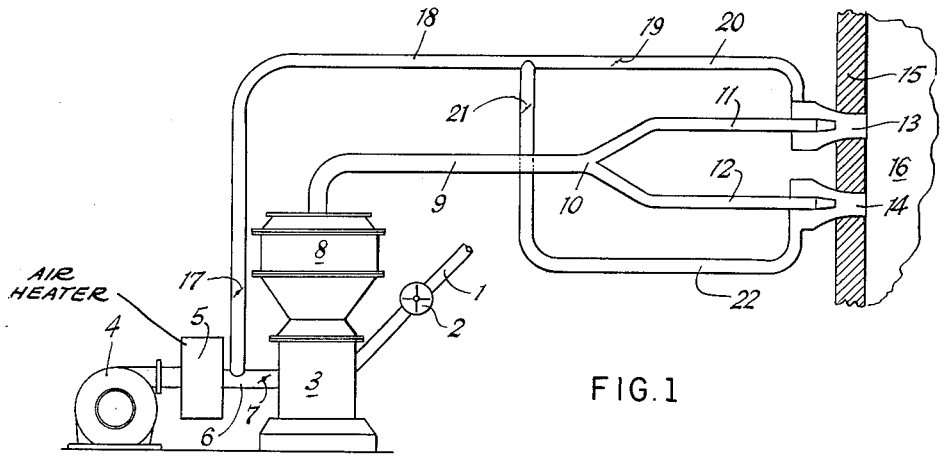

May 8, 1962 H. HENNECKE 3,033,134
METHOD OF AND APPARATUS FOR REGULATING THE AIR-BORNE
MATERIAL DELIVERED THROUGH AT LEAST
TWO BRANCH CONDUITS
Filed March 30, 1954

INVENTOR
*Herman Hennecke*
BY
*J.P. Moran*
ATTORNEY

United States Patent Office 3,033,134
Patented May 8, 1962

3,033,134
METHOD OF AND APPARATUS FOR REGULATING THE AIR-BORNE MATERIAL DELIVERED THROUGH AT LEAST TWO BRANCH CONDUITS
Herman Hennecke, Oberhausen, Germany, assignor to The Babcock & Wilcox Company, New York, N.Y., a corporation of New Jersey
Filed Mar. 30, 1954, Ser. No. 419,885
Claims priority, application Germany Apr. 4, 1953
2 Claims. (Cl. 110—104)

This invention relates to a method of and apparatus for regulating the distribution of air-borne solid material to two or more branch conduits, and more particularly to the regulation of pulverized fuel delivery to a furnace.

The distribution of the carrier air current carrying granulated or pulverized material to two or more branch conduits with a predetermined amount of material fed to each branch requires devices which control the quantitative distribution to each of the branch conduits. Heretofore, such devices have included various types of valves or the like. For control purposes, such devices are sometimes unsatisfactory in that adjustment of the valves not only changes the amount of material distributed to the branch conduits, but also change the flow of the carrier air thereto. In air-borne conveying systems, as for example when pulverized fuel is delivered to a furnace, it is not desirable to go below minimum velocity conditions so as to avoid settling out in the transport conveyors. Under these conditions, the minimum capacity of the conveying conduit is definitely limited. Control devices such as valves in the conduits are also subjected to erosion and frequently deteriorate to a point where the valves are ineffective for control purposes.

In accordance with the present invention it is possible to regulate the flow of air-borne solids through branch conduits to a quantitative value approaching no solid material flow. In addition, wear on the control devices by reason of erosion is avoided by use of the present invention. This is accomplished by the introduction of superatmospheric pressure gaseous fluid into the conduit system so as to change the distribution of the air-borne material flow through the conduits. However, it is necessary for at least two of the conduits to be in operation simultaneously even though one of the conduits may not be delivering any substantial amount of air-borne solids.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of the invention.

Figure 2:
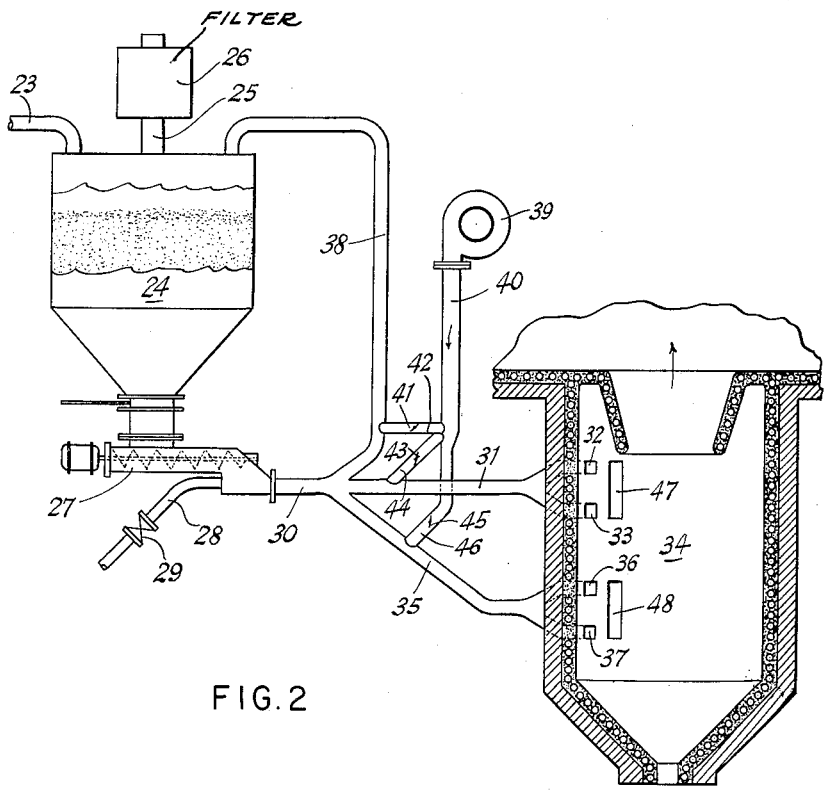

Of the drawings:

FIG. 1 is a schematic representation of the present invention as applied in the supply of pulverized coal from a pulverizer directly to a furance; and FIG. 2 is a schematic representation illustrating the application of the present invention to a storage system of pulverizer directly to a furnace; and As shown in FIG. 1, raw coal is delivered through a chute 1 from an overhead bunker (not shown) through a feeder 2 into a pulverizer 3. The pulverizer is of the air-swept type, where the air from the blower 4 is passed through a heater 5, and is delivered through a pipe 6 to the pulverizer. The flow of air through the pipe 6 is regulated by means of a damper or regulating valve 7. The coal delivered to the pulverizer from the feeder 2 is pulverized by mechanical action, and dried within the pulverizer by the hot air supplied thereto through the pipe 6. The pulverized coal is discharged from the pulverizer 3 to a classifier 8, with fine coal, of selected characteristics, passed by the carrier air current through the outlet pipe 9 to a distributing manifold 10, and thereafter through branch pipes 11 and 12 to the burners 13 and 14 positioned in a wall 15 of a furnace 16.

In the embodiment shown, an air conduit 18 having a flow control damper 17 therein is connected with the pipe 6 and delivers air to valved branch air conduits 20 and 22. The conduits 20 and 22 are provided with individual dampers 19 and 21, respectively, for the controlled flow of air to the burners 13 and 14.

In the operation of the pulverizer, the amount of raw coal delivered by the feeder 2 is changed in accordance with amount of fuel desired in the furnace 16. In one concept of the invention the flow of hot air through the pulverizer is maintained substantially uniform through a range of fuel output capacities so that the amount of carrier air passing through the conduit 9 will remain practically unchanged regardless of the range of fuel requirements in the furnace. It will be understood that the ratio of carrier air to coal delivered to the pulverizer may be maintained in any desired proportion.

As shown in FIG. 1, the burners 13 and 14 are constructed and arranged so that the carrier air and entrained pulverized coal discharged from the ends of the pipes 11 and 12 will exert an aspirating effect on the air discharging from the pipes 20 and 22. With the manifold 10 constructed for a substantially equal division of carrier air flow to the pipes 11 and 12 and with the flow resistance of the branches 11 and 12 substantially equal, substantially equal amounts of air-borne fuel will be delivered to the burners 13 and 14. Such a condition, however, can only be possible if the amount of air flow through the pipes 20 and 22 is also substantially equal.

In the operation of the apparatus described, let it be assumed that the burner 13 should be supplied with a greater amount of air-borne fuel than the burner 14. Under these circumstances, the valve 21 in the conduit 22 is opened to a greater extent and the valve 19 in the conduit 20 is partially closed. Under these conditions, more air will flow through the pipe 22 to the burner 14. The higher pressure in the burner 14 will increase the overall flow resistance through the burner pipe 12 and will reduce the amount of air-borne fuel delivered through the pipe 12. Simultaneously, a proportionately greater amount of air-borne fuel will flow through the pipe 11 through the burner 13 by reason of the reduced pressure produced in the burner 13 by the reduction in secondary air flow through the pipe 20. It is possible to substantially cut off flow of air-borne fuel through the pipe 12 by suitable adjustment of secondary air flow through the pipe 22 to the burner 14.

It will be understood, however, that it is impossible to simultaneously stop flow of air-borne fuel through both the pipes 11 and 12 as long as the pulverizer is operating since, under these conditions, secondary air delivered by the duct 18 through the burners 13 and 14 will eventually cause reverse flow through the pipe 9 to the pulverizer. By reason of the closely spaced relation of the burners 13 and 14, and the small amount of carrier air used for the delivery of fuel from the pulverizer there is no adverse effect upon fuel combustion, as a result of the delivery of substantially only secondary air through the burner 14. Under these conditions, the secondary air delivered from the burner 14 will combine with the air-borne fuel delivered from the burner 13 for substantially complete combustion of the fuel.

In the arrangement shown in FIG. 2, the pulverized fuel is delivered to a bin 24 through a pipe 23. The air-borne fuel is separated from the carrier air within the bin with the separated air discharging through an outlet pipe 25 to a cyclone separator or filter 26, for discharge to the atmosphere. The air-borne fuel separated from its carrier air is deposited within the bin 24. The pulverized fuel is withdrawn from the bottom of the bin 24 by means of a screw conveyor or similar fuel feeding device 27 for mixing with carrier air which is supplied through a duct 28. In accordance with good practice, the duct 28 is provided with an air flow control valve 29 which is capable of complete closing to shut off all air delivery to the feeder 27. The mixture of pulverized fuel and air supplied by the feeder 27 discharges through a pipe 30 which is provided with three branch pipes 31, 35 and 38. The branch pipe 31 divides near its discharge end and leads to the burner nozzles 32 and 33 tangentially positioned in the wall of a cyclone type furnace 34. The branch pipe 35 forks in a manner similar to the pipe 31 and leads to the tangentially arranged burner nozzles 36 and 37 likewise positioned in the wall of the cyclone furnace 34 at a position downwardly spaced from the burner nozzles 32 and 33. The third branch pipe 38 from the pipe 30 discharges into the upper portion of the storage bin 24.

In this embodiment of the invention, a blower 39 is arranged to supply high pressure air through the conduit 40 and through the branch conduits 42, 44 and 46 to the fuel and air pipes 38, 31 and 35, respectively. Each of the branch air pipes is provided with an air flow regulating valve 41, 43 and 45 in the pipes 42, 44 and 46, respectively.

The fuel discharged from the tangentially arranged burners 32 and 33 is provided with secondary combustion air from a port 47 which is tangentially positioned in the wall of the cyclone furnace 34. The fuel discharged from the nozzles 36 and 37 is also provided with secondary air through a port 48 in the wall of the furnace. The great majority of the combustion air for the fuel delivered to the cyclone is supplied through the secondary air ports 47 and 48 from a separate high pressure blower (not shown).

The pipe 38 connecting the pipe 30 and the bin 24 is provided for the return of pulverized coal to the bin when the burner lines 31 and 35 are operated at a fuel rate less than that delivered by the feeder 27. As hereinbefore explained in connection with FIG. 1, the admission of air through either or both of the branch air conduits 44 and 46 will restrict the flow of air-borne fuel to the burner nozzles in the cyclone furnace. Under these circumstances, the excess air-borne fuel would be discharged through the pipe 38. The blower 39 is operated at a lower pressure than the air pressure prevailing in the pipe 28, and while cutting off or substantially reducing the flow of air-borne fuel through the pipes 31 and 35 would ordinarily tend to cause a reverse flow in the pipe 30, the higher air pressure in the line 28 necessitates the discharge of the excess of air-borne fuel to the bin 24.

It will be observed the present invention provides means for regulating the flow of air-borne fuel through branch pipes leading to the burners of a combustion chamber. Advantageously, this is accomplished by the introduction of a gaseous fluid, such as air, into the air-borne stream of solid materials so as to alter the flow resistance through one or more branch pipes of the carrier system. Such change in the resistance to air-borne material flow through the pipes can be accomplished without erosion of the regulating means, and the flow velocity of the air stream through the branch pipes will be maintained above a minimum velocity at which the entrained solid may settle out of suspension in the carrier air.

While in accordance with the provisions of the statutes I have illustrated and described herein a preferred embodiment of the invention, those skilled in the art will understand that changes may be made in the method of operation and form of the apparatus disclosed without departing from the spirit of the invention covered by my claims, and that certain features of the invention may sometimes be used to advantage without a corresponding use of other features.

What is claimed is:

1. The method of controlling the distribution of air-borne material moving through branch pipes from a common source which comprises introducing high pressure gaseous fluid into at least one of said branch pipes, and controlling the proportional distribution of air-borne material flow through said branch pipes by the regulation of the rate of flow of high pressure fluid to each of said branch pipes in inverse relation to the desired distribution of air-borne material flow through said branch pipes.

2. The method of controlling the flow rate of air-borne pulverized coal through at least two branch pipes which comprises delivering air-borne pulverized coal to said branch pipes from a common source, and changing the resistance to air-borne pulverized coal flow through said branch pipes by proportionally introducing a flow of gaseous fluid to said branch pipes from a separate source and at a pressure greater than said air-borne coal, said change in resistance to flow through said branch pipes changing the distribution of air-borne pulverized coal between said branch pipes while maintaining the total gaseous fluid flow through said branch pipes.

References Cited in the file of this patent

UNITED STATES PATENTS

| | | |
|---|---|---|
| 1,370,872 | Amsler | Mar. 8, 1921 |
| 1,420,904 | Assereto et al. | June 27, 1922 |
| 1,454,979 | Muhlfeld et al. | May 15, 1923 |
| 1,496,913 | Warford | June 10, 1924 |
| 1,532,260 | Osthoff | Apr. 7, 1925 |

FOREIGN PATENTS

| | | |
|---|---|---|
| 518,077 | Great Britain | Feb. 16, 1940 |